United States Patent
Jing et al.

(10) Patent No.: US 10,164,563 B2
(45) Date of Patent: Dec. 25, 2018

(54) METHOD AND APPARATUS FOR CONTROLLING AN ELECTRIC MACHINE

(71) Applicant: GM GLOBAL TECHNOLOGY OPERATIONS LLC, Detroit, MI (US)

(72) Inventors: Xin Jing, Rochester, MI (US); Brian A. Welchko, Oakland, MI (US); Constantin C. Stancu, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 15/130,333

(22) Filed: Apr. 15, 2016

(65) Prior Publication Data

US 2017/0302215 A1    Oct. 19, 2017

(51) Int. Cl.
| | | |
|---|---|---|
| *H02H 7/09* | (2006.01) | |
| *H02P 29/024* | (2016.01) | |
| *H02P 6/182* | (2016.01) | |
| *H02P 27/08* | (2006.01) | |

(52) U.S. Cl.
CPC ............ *H02P 29/024* (2013.01); *H02P 6/182* (2013.01); *H02P 27/085* (2013.01)

(58) Field of Classification Search
USPC .... 318/400.22, 400.34, 400.17, 400.26, 801, 318/515, 819
See application file for complete search history.

(56) References Cited

U.S. PATENT DOCUMENTS

| | | | |
|---|---|---|---|
| RE42,200 E | 3/2011 | Welchko et al. | |
| 2007/0205798 A1* | 9/2007 | Disser | G01R 19/2513 324/765.01 |
| 2008/0304189 A1* | 12/2008 | Tang | H02H 7/0838 361/33 |
| 2017/0166064 A1* | 6/2017 | Chen | B60L 11/18 |

OTHER PUBLICATIONS

Welchko, Jahns, Soong, Nagashima; "IPM Synchronous Machine Drive Response to Symmetrical and Asymmetrical Short Circuit Faults"; IEEE, vol. 18, No. 2 Jun. 2003, pp. 291-298.

* cited by examiner

Primary Examiner — Jorge L Carrasquillo
Assistant Examiner — Iftekhar Mustafa
(74) Attorney, Agent, or Firm — Quinn IP Law

(57) ABSTRACT

An electric power system for supplying power to a permanent magnet electric machine includes a high-voltage DC power source that is disposed to supply electric power to a front-end converter connected via a high-voltage DC bus to an electric inverter that is connected to the electric machine. A method for operating a control system includes monitoring the electric machine. Upon detecting a fault associated with the electric machine, a controller commands operation of the front-end converter to generate a voltage level on the high-voltage DC bus that is a maximum setpoint voltage level and monitors back-emf voltage level from the electric machine. The inverter is controlled to a three-phase open state when the back-emf voltage level is less than the maximum setpoint voltage level. The inverter is controlled to a three-phase short state when the back-emf voltage level is greater than the maximum setpoint voltage level.

15 Claims, 2 Drawing Sheets

METHOD AND APPARATUS FOR CONTROLLING AN ELECTRIC MACHINE

TECHNICAL FIELD

The disclosure relates to electric power systems that employ inverters and electric machines, and development and control thereof.

BACKGROUND

A high-voltage electric power circuit for controlling an electric machine such as a multi-phase electric motor/generator may include a high-voltage DC power source that is electrically connected to a front-end DC-to-DC electric power converter (hereafter 'front-end converter') to increase voltage level that is supplied to a high-voltage DC bus of an inverter. A bulk capacitor may be arranged across the high-voltage DC bus to provide electrical stability and store supplemental electric energy. Operation and control of electric machines, such as permanent magnet synchronous electric motors may be accomplished by employing the inverter to transform DC electric power to AC power using pulsewidth-modulated (PWM) control signals that are output from a controller. Known inverters may be controlled in different operation modes, including PWM modes such as sine, hysteresis, over-modulation or space vector PWM modes, a six-step mode, or another suitable mode.

Occurrence of an open circuit fault or a short circuit fault in a high-voltage electric power circuit may result in operating the electric machine in an uncontrolled generator (UCG) mode.

SUMMARY

An electric power system for supplying power to control a permanent magnet electric machine is described and includes a high-voltage DC power source that is disposed to supply electric power to a front-end converter electrically connected via a high-voltage DC bus to an electric inverter that is electrically connected to the electric machine. A method for operating a control system includes monitoring, via a controller, the electric machine. Upon detecting a fault associated with the electric machine, a controller commands operation of the front-end converter to generate a voltage level on the high-voltage DC bus that is a maximum setpoint voltage level and monitors back-emf voltage level from the electric machine. The inverter is controlled to a three-phase open state when the back-emf voltage level is less than the maximum setpoint voltage level. The inverter is controlled to a three-phase short state when the back-emf voltage level is greater than the maximum setpoint voltage level.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
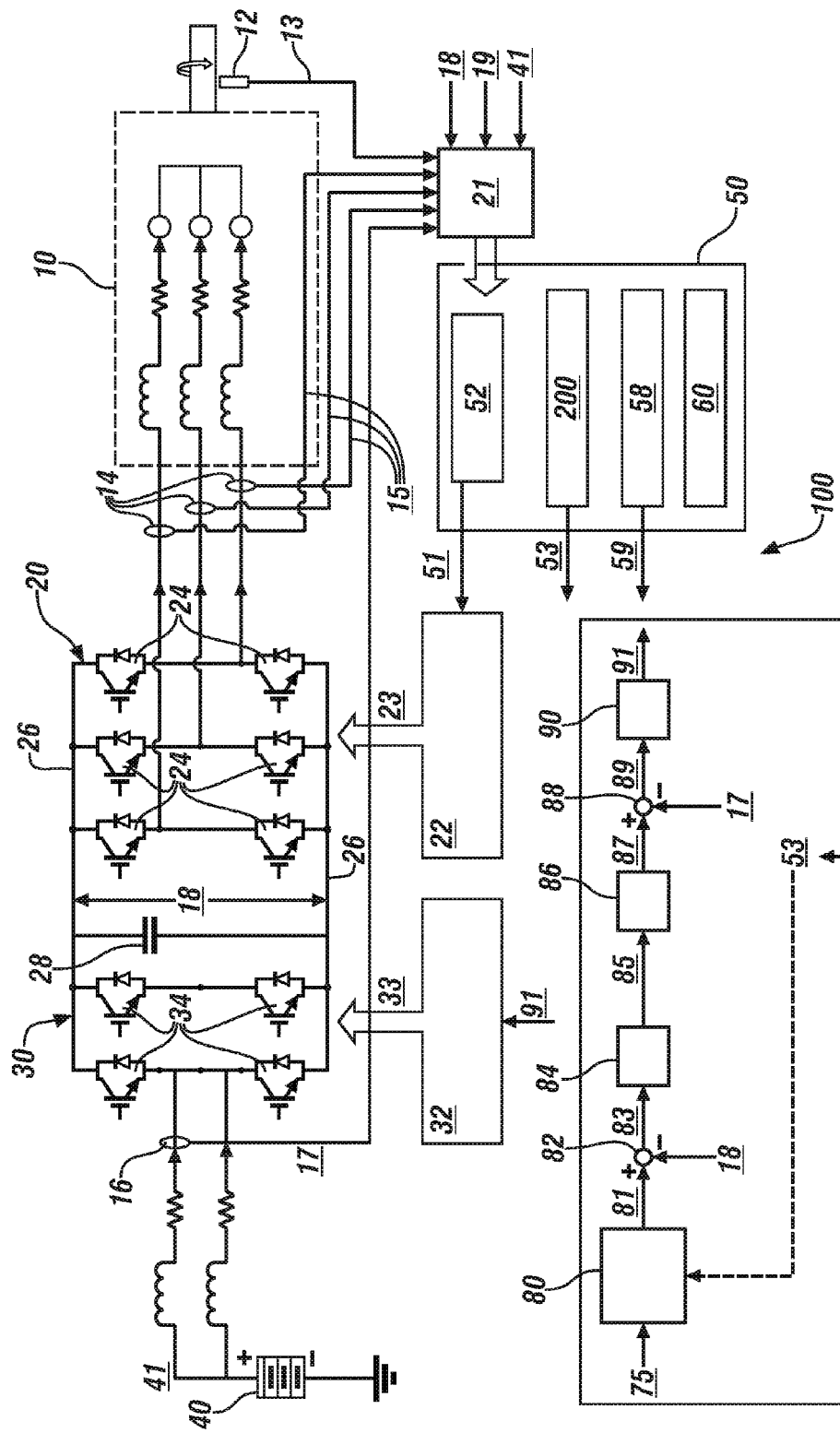
FIG. 1 schematically illustrates one embodiment of an electric power system for supplying power to control an electric machine, including an inverter that is electrically connected to a front-end converter that is supplied electric power from a high-voltage DC power source, and a motor control system, in accordance with the disclosure.

Referring now to the drawings, wherein the depictions are for the purpose of illustrating certain exemplary embodiments only and not for the purpose of limiting the same, FIG. 1 schematically illustrates one embodiment of an electric power system for supplying power to operate and control an electric machine 10. The electric power system preferably includes an electric inverter 20 electrically connected to a front-end converter 30 that is supplied electric power from a high-voltage DC power source 40. The front-end converter 30 is electrically connected to the electric inverter 20 via a high-voltage DC bus 26 that includes a bulk capacitor 28, and operates as a DC-to-DC electric power converter to increase a DC voltage level of the electric power that is supplied to the high-voltage DC bus 26. A motor control system 100 is disposed to monitor and control the electric inverter 20, the front-end converter 30 and the high-voltage DC power source 40. The motor control system 100 controls the electric inverter 20 and the front-end converter 30 to operate the electric machine 10 employing electric power that is supplied from the high-voltage DC power source 40 via the front-end converter 30 and the high-voltage DC bus 26. In one non-limiting embodiment, the electric power system may be employed on a vehicle as an element of a propulsion system. Design and control features related to the motor control system 100 for the electric inverter 20, front-end converter 30, high-voltage DC power source 40, high-voltage DC bus 26 and the bulk capacitor 28 may be developed and assigned as described herein.

The electric machine 10 is preferably a multi-phase permanent magnet electric motor/generator, or, alternatively may be another suitable multi-phase electric machine. The electric inverter 20 electrically connects to the high-voltage DC power source 40 via the high-voltage DC bus 26. The electric inverter 20 includes the bulk capacitor 28 that is electrically arranged between a positive conductor and a negative conductor of the high-voltage DC bus 26. A rotational position sensor 12 is arranged to monitor a rotational position of a rotating output member of the electric machine 10, from which a motor speed/position 13 may be determined. The rotational position sensor 12 may be a resolver, a Hall effect sensor, another suitable rotational position sensing device, or a virtual software replacement.

In one embodiment, the motor control system 100 includes a Voltage Source Inverter (VSI) or other motor controller 50 for controlling the electric inverter 20, and the electric machine 10 is a permanent magnet synchronous device including a stator and a rotor arranged in a star configuration, although the concepts described herein are not so limited. The motor controller 50 controls torque output from the electric machine 10 through the electric inverter 20, which electrically connects to the high-voltage DC electric power source 40 via the front-end converter 30. Control methods for switching among inverter states to regulate torque output of the electric machine 10 may include operating in either a PWM mode or a six-step mode. In the PWM mode, the inverter 20 switches rapidly among two of non-zero states and a zero state. The motor controller 50 specifies what fraction of the time is to be spent in each of the three states by specifying PWM duty cycles. The motor controller 50 updates the PWM duty cycles at regular intervals such that the frequency of updates is significantly higher than the frequency of the rotor rotation. In the six-step mode, the inverter 20 is controlled to cycle the switches 24 through six non-zero states once per electrical cycle of the electric machine 10 to produce an AC voltage level and current in each winding of the stator. An electrical cycle is defined relative to motor poles and does not necessarily correspond to a complete revolution of the rotor. Details of controlling the inverter 20 to operate the electric machine 10 are known to those skilled in the art.

In addition to the linear mode, the motor controller 50 preferably includes a current regulator and a six-step voltage controller for controlling operation of inverter 20 to control operation of the electric machine 10 in over-modulation and the six-step mode. The amplitude of the AC voltage is dictated by the DC voltage level on the high-voltage DC bus 26 that electrically connects via the front-end converter 30 to the high-voltage DC power source 40. The torque is dictated by the DC voltage level, the rotor speed, and the phase difference between these quasi-sinusoidal AC voltage signals and the rotor position, and is further controlled by operating the control system in six-step mode. The motor controller 50 generates control signals 51 that are communicated to an inverter gate drive circuit 22 to control inverter switching.

The electric inverter 20 is preferably electrically arranged between the front-end converter 30 and the electric machine 10, and includes a plurality of switches 24 that are arranged as switch pairs that electrically connect in series between the positive and negative conductors of the high-voltage DC bus 26. Each of the switch pairs corresponds to one of the phases of the electric machine 10. As shown, the electric machine 10 is configured as a three-phase device, and the electric inverter 20 includes three switch pairs, each of which is connected to one of the phases of the electric machine 10. The one of the switches 24 of each switch pair that is connected to the positive conductor of the high-voltage DC bus 26 is referred to herein as an "upper" switch, and the one of the switches 24 of each switch pair that is connected to the negative conductor of the high-voltage DC bus 26 is referred to herein as a "lower" switch. Each of the switches 24 of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. An inverter gate drive circuit 22 preferably includes a plurality of gate drives and a controller, wherein the inverter gate drive circuit 22 generates the control signals 23 to control activation and deactivation of the switches 24 in response to control signals 51, e.g., pulsewidth-modulated control signals, which originate from a PWM control routine 52 that is executed in the motor controller 50 of the motor control system 100. The power inverter module 20 includes other electrical components including capacitors, resistors and other electrical circuit components to accomplish functions related to electrical noise suppression, load balancing and the like.

Current sensors 14 are arranged to monitor magnitudes of electrical currents Ia, Ib and Ic 15 that are transferred to the a, b and c phases of the electric machine 10. In an embodiment wherein the electric machine 10 is arranged in a wye configuration (not shown), only two of the electrical currents may need to be monitored. The current sensors 14 may employ any suitable current sensing technology, including, e.g., magnetic field generation monitoring or voltage level differential monitoring.

The bulk capacitor 28 may be any suitable capacitive storage device, e.g., an electrolytic aluminum device, a ceramic device, or a film device. Size of the bulk capacitor 28 may be described in terms of its total capacitance, and may be selected based upon amplitude of ripple voltage on the high-voltage DC bus 26 and other factors. As understood by those skilled in the art, capacitance of the bulk capacitor 28 is determined in relation to parameters including peak current, RMS current, which is a parameterized value for the ripple voltage level, minimum and maximum bus voltage levels, operating temperatures and others. As such, size of the bulk capacitor 28, in terms of its capacitance, may be selected based upon expected DC bus voltage ripple when operating the inverter 20 employing a six-step mode of operation. The bulk capacitor 28 is shown as a single device for ease of illustration. It is appreciated that the bulk capacitor 28 may be composed of a plurality of capacitor devices that are electrically arranged in series, parallel, or any other suitable electrical configuration to provide electrical capacitance in the electric circuit between the positive and negative conductors of the high-voltage DC bus 26. A voltage sensing system is arranged to monitor a bus electrical potential Vdc 18, which is measured across the positive and negative conductors of the high-voltage DC bus 26.

In one embodiment, and as shown, the front-end converter 30 includes two pairs of switches 34 arranged as switch pairs that electrically connect to the high-voltage DC power source 40, and also electrically connect between the positive and negative conductors of the high-voltage DC bus 26. As shown, the front-end converter 30 includes two switch pairs that are arranged between the positive and negative conductors of the high-voltage DC bus 26. Each of the switches 34 of the switch pairs may be an IGBT having a diode arranged in parallel, or another suitable high-voltage switch, e.g., a FET or an SiC FET. A boost gate drive circuit 32 preferably includes a plurality of gate drives and a controller, wherein the boost gate drive circuit 32 generates boost control signals 33 to control activation and deactivation of the switches 34 in response to boost control signals 91, e.g., pulsewidth-modulated control signals, which originate from the motor control system 100. The front-end converter 30 includes other electrical components including capacitors, resistors and other electrical circuit components to accomplish functions related to electrical noise suppression, load balancing and the like. Other details related to the electrical arrangement of the electric inverter 20, the front-end converter 30 and the electric machine 10 are known to those skilled in the art.

The high-voltage DC power source 40 may be any suitable electric power source, e.g., a lithium-ion battery or an ultra-capacitor. A voltage level sensing system is arranged to monitor battery electrical potential Vbatt 41 that is supplied from the high-voltage DC power source 40 to the front-end converter 30. Current sensor 16 is arranged to monitor the magnitude of electrical current that is transferred from the high-voltage DC power source 40 to a node connecting one of the switch pairs of the front-end converter 30, e.g., boost current Iα 17.

The motor control system 100 controls the electric inverter 20 and the front-end converter 30 to operate the electric machine 10 employing electric power that is supplied from the high-voltage DC power source 40 via the front-end converter 30 and the high-voltage DC bus 26. The motor control system 100 may be arranged as a unitary controller or as a plurality of controllers each having specific operational requirements. As shown, the motor control system 100 includes the motor controller 50 that generates motor control signals 51 that are communicated to the inverter gate drive circuit 22, and a boost controller 70 that generates boost control signals 91 that are communicated to the boost gate drive circuit 32.

The motor controller 50 monitors signal inputs from the motor control system 100, preferably employing an analog/digital converter 17 or another suitable device. The monitored signal inputs preferably include electrical currents Ia, Ib and Ic 15 from the current sensors 14 arranged to monitor inputs to the a, b and c phases of the electric machine 10, the boost current Iα 17 from the high-voltage DC power source 40 to the front-end converter 30, the battery electrical potential Vbatt 41 that is supplied from the high-voltage DC power source 40 to the front-end converter 30, the bus electrical potential Vdc 18 across the positive conductor and the negative conductor of the high-voltage DC bus 26, and the motor speed/position 13 of the rotating output member of the electric machine 10. The motor controller 50 also monitors a motor torque command 19, which may be generated in another controller based upon an operator request for power and other factors.

The motor controller 50 executes multiple control routines to determine various control and operating states associated with the electric machine 10. One control routine of the motor controller 50 includes the PWM control routine 52 that determines the motor control signals 51 that are communicated to the inverter gate drive circuit 22 to control the inverter 20. The motor control signals 51 may be in the form of duty cycles for PWM signals that are determined based upon the motor torque command 19, the motor speed/position 13, the electrical currents 15 and the bus electrical potential Vdc 18. The motor control signals 51 may instead be in the form of six-step duty cycles for PWM signals for operating in the six-step mode that are determined based upon the motor torque command 19, the motor speed/position 13, the electrical currents 15 and the bus electrical potential Vdc 18. Those skilled in the art are able to develop and implement a suitable PWM control routine 52 that determines the motor control signals 51. The motor control signals 51 preferably include Da, Db and Dc duty cycle control signals, wherein Da represents a duty cycle associated with controlling a first of the switch pairs of the inverter 20 that electrically connects to a first leg of the electric machine 10, Db represents a duty cycle associated with controlling a second of the switch pairs of the inverter 20 that electrically connects to a second leg of the electric machine 10, and Dc represents a duty cycle associated with controlling a third of the switch pairs of the inverter 20 that electrically connects to a third leg of the electric machine 10.

The motor controller 50 executes a DC current routine 58, in the form of executable instructions and predetermined calibrations to determine a DC motor current $I_{dc}$ 59 in accordance with the following equation:

$$I_{dc} = Da*Ia + Db*Ib + Dc*Ic \quad [1]$$

wherein:
$I_{dc}$ represents the DC inverter current,
Da, Db, and Dc represent the first, second and third duty cycle control signals that are output from the PWM control routine 52, and
Ia, Ib and Ic represent the electrical currents that are input to the a, b and c phases of the electric machine 10.

The motor controller 50 preferably executes a fault monitoring routine 60, in the form of executable instructions and predetermined calibrations that monitor and detect occurrence of short-circuit or open-circuit faults in the high-voltage DC power source 40, the front-end converter 30, the inverter 20, the electric machine 10 and the high-voltage DC bus 26. Fault detection routines are known and not described herein.

The boost controller 70 includes a boost control routine 71, in the form of executable instructions and predetermined calibrations, that generates boost control signals 91 based upon the bus electrical potential Vdc 18, a commanded high-voltage bus electrical potential $V_{dc}$* 75, a setpoint value for the high-voltage bus electrical potential $V_{dc}$* 53, and a measured boost current Iα* 17. The boost control routine 71 operates as follows. A maximum of the commanded high-voltage bus electrical potential Vdc* 75 and the setpoint value for the high-voltage bus electrical potential Vdc* 53 is selected (80) and an adjusted voltage command $V_{adj}$* 81, wherein the setpoint value for the high-voltage bus electrical potential $V_{dc}$* 53 has a small or zero value when no fault has been detected. The adjusted voltage command $V_{adj}$* 81 is reduced by the bus electrical potential Vdc 18 (82) and the resultant 83 is subjected to a first proportional-integral control routine (84) to determine a reference current $I_{ref}$ 85, which is divided in half (86) to determine a commanded boost current Iα* 87. The commanded boost current Iα* 87 is reduced by the measured boost current Iα 17 (88) and the resultant 89 is subjected to a second proportional-integral control routine (90) to determine the boost control signals 91 in the form of a commanded duty cycle D* for controlling the boost gate drive circuit 32 based thereon.

The motor controller 50 preferably executes a fault mitigation routine 200 in the form of executable instructions and predetermined calibrations. The fault mitigation routine 200 is described with reference to FIG. 2, and is part of an embodiment of the motor control system 100 to control operation of the electric inverter 20 and the front-end converter 30 to operate the electric machine 10 employing electric power that is supplied from the high-voltage DC power source 40 via the high-voltage DC bus 26, as described with reference to FIG. 1. Table 1 is provided as a key wherein the numerically labeled blocks and the corresponding functions are set forth as follows, corresponding to the fault mitigation routine 200.

TABLE 1

| BLOCK | BLOCK CONTENTS |
| --- | --- |
| 210 | Monitor operating parameters of the front-end converter, electric inverter and the electric machine |
| 212 | Is fault detected? |
| 214 | Command operation of the front-end converter to generate a voltage level on the high-voltage DC bus that maximizes system efficiency and power |

TABLE 1-continued

| BLOCK | BLOCK CONTENTS |
|---|---|
| 220 | Set inverter to operate in 3-phase open state |
| 222 | Command operation of the front-end converter to generate a voltage level on the high-voltage DC bus that is a maximum setpoint voltage level |
| 224 | Monitor back emf |
| 226 | Is back emf voltage level greater than the maximum setpoint voltage level? |
| 228 | Command inverter to operate in 3-phase short state |
| 230 | Command inverter to operate in 3-phase open state |

During operation of the motor control system, operating parameters such as current and voltage levels are periodically monitored for purposes of motor control and fault monitoring, with such operation occurring in the motor controller as part of the fault monitoring routine 60 (210). Fault states that may be detected include, by way of non-limiting examples, either an open circuit or a short circuit in one of the electrical leads or connections of the front-end converter 30, the electric inverter 20 and the electric machine 10. Faults may include, by way of non-limiting example, an overvoltage, a sensor fault, a voltage bias fault, desaturation of one or more of the switches 24, 34, or a system-related fault that may be external to the motor control. When no faults are detected (212)(1), the motor controller 50 controls the motor control signals 51 that are communicated to the inverter gate drive circuit 22 to control the inverter 20, and the boost controller 70 operates the boost control routine 71 to generate a boost control voltage level that optimizes system efficiency and power generation through the front-end converter 30, the electric inverter 20 and the electric machine 10 in response to operator commands (214). Such operation to generate a boost control voltage level that optimizes system efficiency and power generation is known to those skilled in the art.

When a fault associated with one of the front-end converter 30, the electric inverter 20 and the electric machine 10 is detected (212)(0), the boost controller 70 operates the boost control routine 71 to generate a boost control voltage level that is a maximum boost control setpoint voltage level (222). The maximum boost control setpoint voltage level is a threshold voltage level at which the boost controller 70 can control the high-voltage DC bus 26 with the inverter 20 operating in a three-phase open state without entering into an uncontrolled generator (UCG) state. A first rotational speed ω1 of the electric machine 10 is a maximum rotational speed associated with operation of the boost controller 70 to control the high-voltage DC bus 26 absent a fault associated with one of the front-end converter 30, the electric inverter 20 or the electric machine 10. A second rotational speed ω2 for the electric machine 10 is associated with the maximum boost control setpoint voltage level, which is a threshold voltage level at which the boost controller 70 can control the high-voltage DC bus 26 with the inverter 20 operating in a three-phase open state without entering into an uncontrolled generator (UCG) state. The second rotational speed ω2 is greater than the first rotational speed ω1.

In one embodiment, the motor controller 50 may initially command the inverter gate drive circuit 22 to control the inverter 20 to a three-phase open state, wherein the upper and lower switches 24, 34 of all of the switch pairs are controlled in an open state for a relatively short period of time, e.g., 500-1500 μs (220).

A bus electrical potential Vdc 18 is monitored, and is indicative of a back-emf voltage level that is being generated by the electric machine 10 at its present rotational speed (224).

When the back-emf voltage level is greater than the maximum boost control setpoint voltage level (226)(1), the motor controller 50 commands the inverter gate drive circuit 22 to control the inverter 20 to a three-phase short state (228). The three-phase short state may include controlling the lower switches 34 of all of the switch pairs in a closed or shorted state (228), or alternatively, controlling the upper switches 24 of all of the switch pairs in a closed or shorted state. The three-phase short response creates a short circuit on the motor terminals and effectively removes the dc link and boost from the system operation. The back-emf of the magnets of the electric machine 10 will induce current, thus producing a braking torque. At high speed, the braking torque may be significantly less than the torque that would be generated if currents were induced by entering the UCG state with all of the upper and lower switches 24, 34 in an open state.

When the back-emf voltage level is less than the maximum boost control setpoint voltage level (226)(0), the motor controller 50 commands the inverter gate drive circuit 22 to control the inverter 20 to the three-phase open state, wherein the upper and lower switches 24, 34 of all of the switch pairs are controlled in an open state (230).

Figure 2:
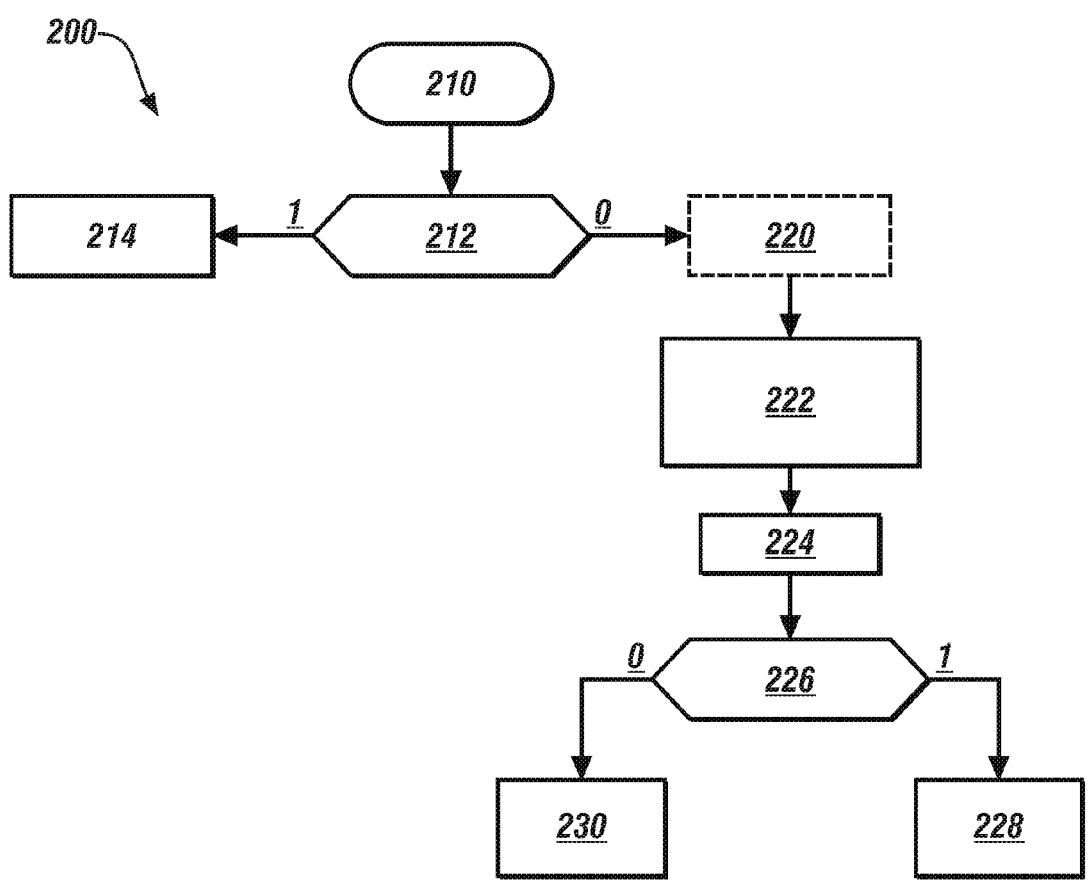
FIG. 2 schematically illustrates a fault mitigation routine, which is executed as part of an embodiment of the motor control system for controlling operation of the front-end converter and electric inverter that are arranged to operate the electric machine employing electric power that is supplied from the high-voltage DC power source via the high-voltage DC bus, in accordance with the disclosure.

The fault mitigation routine 200 described with reference to FIG. 2 precludes a fault response in the form of a three-phase open response that includes commanding all of the switches 24 of the inverter 20 to an off or open state. Thus, the fault mitigation routine 200 may prevent operation in a UCG state. Under an operating condition that includes the UCG state, the electric machine 10 is connected to the high-voltage bus 26 and bulk capacitor 28 via anti-parallel diodes that are arranged in parallel with the switches 24. If the back-emf voltage level exceeds the voltage level of the high-voltage bus 26, the magnets of the electric machine 10 will induce current flow in the windings and produce a braking torque, which may be significant depending on the motor design. Furthermore, the fault mitigation routine 200 prevents demagnetization of the electric machine 10 under conditions that may include a short circuit fault that is followed by high motor current, such as may occur during a transient to a three-phase short state. Furthermore, the fault mitigation routine 200 prevents or minimizes adding energy into the high-voltage DC power source 40. If the high-voltage DC power source 40 is disconnected, minimizes likelihood of an increase in the voltage level on the bulk capacitor 28 to a point at which the back-emf voltage level is in equilibrium with the voltage level of the high-voltage DC bus 26, and minimizes likelihood of exceeding a maximum capacitor voltage level. By boosting up the DC bus voltage level, the motor controller 50 can be directly commanded to operate at a three-phase open state at a higher speed ω2, and the switches 24 of the inverter 20 may be commanded to the open state without entering the UCG state when the motor speed is less than the speed of ω2. Between the speeds of ω1 and ω2, a large initial transient that may be introduced by a three phase short may be avoided. Between the speeds of ω1 and ω2, wherein ω1 is less than ω2, an expected transition from short to open, which is currently existing in known motor control algorithms, may be avoided.

Furthermore, the front-end converter system may be designed with the second speed ω2 as the maximum operation speed. The system can be commanded to operate in the three phase short state at speeds greater than the second speed ω2 if the back-emf remains greater than the front-end converter output voltage level.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a control system for a permanent magnet electric machine, wherein the control system includes a high-voltage DC power source disposed to supply electric power to a front-end converter electrically connected via a high-voltage DC bus to an electric inverter that is electrically connected to the electric machine, the method comprising:
   monitoring, via a controller, the electric machine; and
   upon detecting a fault associated with the electric machine:
      commanding operation of the front-end converter to generate a voltage level on the high-voltage DC bus that is a maximum setpoint voltage level,
      monitoring back-emf voltage level from the electric machine,
      controlling the inverter to a three-phase open state when the back-emf voltage level is less than the maximum setpoint voltage level, and
      controlling the inverter to a three-phase short state when the back-emf voltage level is greater than the maximum setpoint voltage level;
      wherein the maximum setpoint voltage level comprises a maximum threshold voltage level on the high-voltage DC bus that is generated by the front-end converter with the inverter operating in a three-phase open state without entering into an uncontrolled generator (UCG) state, and is associated with a second rotational speed that is greater than a first rotational speed, wherein the first rotational speed is a maximum rotational speed associated with operation to control the high-voltage DC bus absent a fault associated with one of the front-end converter, the electric inverter or the electric machine.

2. The method of claim 1, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase open state comprises controlling all of the upper and lower switches to open states.

3. The method of claim 1, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase short state comprises controlling all of the lower switches to short states.

4. The method of claim 1, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase short state comprises controlling all of the upper switches to short states.

5. The method of claim 1, wherein monitoring back-emf voltage level from the electric machine comprises monitoring an electrical potential across the positive and negative conductors of the high-voltage bus.

6. A method for operating a control system for a permanent magnet electric machine, wherein the control system includes a high-voltage DC power source disposed to supply electric power to a front-end converter electrically connected via a high-voltage DC bus to an electric inverter that is electrically connected to the electric machine, the method comprising:
monitoring, via a controller, the control system and the electric machine; and
upon detecting a fault associated with one of the control system or the electric machine:
controlling the inverter to a three-phase open state,
commanding operation of the front-end converter to generate a voltage level on the high-voltage DC bus that is a maximum setpoint voltage level,
monitoring back-emf voltage level from the electric machine,
controlling the inverter to the three-phase open state when the back-emf voltage level is less than the maximum setpoint voltage level, and
controlling the inverter to a three-phase short state when the back-emf voltage level is greater than the maximum setpoint voltage level,
wherein the maximum setpoint voltage level comprises a maximum threshold voltage level on the high-voltage DC bus that is generated by the front-end converter with the inverter operating in a three-phase open state without entering into an uncontrolled generator (UCG) state, and is associated with a second rotational speed that is greater than a first rotational speed, wherein the first rotational speed is a maximum rotational speed associated with operation to control the high-voltage DC bus absent a fault associated with one of the front-end converter, the electric inverter or the electric machine.

7. The method of claim 6, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase open state comprises controlling all of the upper and lower switches to open states.

8. The method of claim 6, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase short state comprises controlling all of the lower switches to short states.

9. The method of claim 6, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein controlling the inverter to the three-phase short state comprises controlling all of the upper switches to short states.

10. The method of claim 6, wherein monitoring back-emf voltage level from the electric machine comprises monitoring an electrical potential across the positive and negative conductors of the high-voltage bus.

11. A control system for an electric machine, comprising:
a high-voltage DC power source disposed to supply electric power to a front-end converter electrically connected via a high-voltage DC bus to an electric inverter that is electrically connected to the electric machine; and
a controller, operatively connected to the front-end converter and the electric inverter, the controller including an instruction set, the instruction set executable to:
monitor the electric machine for occurrence of a fault; and
upon detecting a fault associated with the electric machine:
command operation of the front-end converter to generate a voltage level on the high-voltage DC bus that is a maximum setpoint voltage level,
monitor back-emf voltage level from the electric machine,
control the inverter to a three-phase open state when the back-emf voltage level is less than the maximum setpoint voltage level, and
control the inverter to a three-phase short state when the back-emf voltage level is greater than the maximum setpoint voltage level,
wherein the maximum setpoint voltage level comprises a maximum threshold voltage level on the high-voltage DC bus that is generated by the front-end converter with the inverter operating in a three-phase open state without entering into an uncontrolled generator (UCG) state, and is associated with a second rotational speed that is greater than a first rotational speed, wherein the first rotational speed is a maximum rotational speed associated with operation to control the high-voltage DC bus absent a fault associated with one of the front-end converter, the electric inverter or the electric machine.

12. The control system of claim 11, wherein the electric machine comprises a permanent magnet electric machine.

13. The control system of claim 11, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein the instruction set executable to control the inverter to the three-phase open state comprises the instruction set executable to control all of the upper and lower switches to open states.

14. The control system of claim 11, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein the instruction set executable to control the inverter to the three-phase short state comprises the instruction set executable to control all of the upper switches to closed states.

15. The control system of claim 11, wherein the inverter comprises a plurality of switches that are arranged as a plurality of switch pairs that electrically connect in series between positive and negative conductors of the high-voltage DC bus, each switch pair including an upper switch that is connected to a positive conductor of the high-voltage DC bus and a lower switch that is connected to a negative conductor of the high-voltage DC bus, and wherein the instruction set executable to control the inverter to the three-phase short state comprises the instruction set executable to control all of the lower switches to closed states.

\* \* \* \* \*